United States Patent [19]

Stratil et al.

[11] Patent Number: 4,601,763

[45] Date of Patent: Jul. 22, 1986

[54] METHOD FOR THE MECHANICAL SOFT-SOLDERING OF HEAVY METALS UTILIZING A FLUXING AGENT

[75] Inventors: Tomas Stratil, Steinhausen; Milos Pisinger, Zürich; Peter Fehr, Zug, all of Switzerland

[73] Assignee: LGZ Landis & Gyr Zug AG, Zug, Switzerland

[21] Appl. No.: 659,643

[22] Filed: Oct. 11, 1984

[51] Int. Cl.$^4$ ............................................. B23K 35/34
[52] U.S. Cl. ...................................... 148/23; 228/223
[58] Field of Search ................... 228/180.1, 260, 223; 148/23-25

[56] References Cited

U.S. PATENT DOCUMENTS

| | | | |
|---|---|---|---|
| 2,631,952 | 3/1953 | Williams | 148/25 |
| 3,065,538 | 11/1962 | Melchions | 148/24 |
| 3,305,406 | 2/1967 | Chmelik et al. | 148/23 |
| 3,954,494 | 5/1976 | Stayner | 148/25 |
| 3,975,216 | 8/1976 | Stayner | 148/23 |
| 3,985,587 | 10/1976 | Choby | 148/23 |
| 4,028,143 | 6/1977 | Stayner | 148/23 |
| 4,092,182 | 5/1978 | Arbib et al. | |
| 4,140,554 | 2/1979 | Stayner | 148/23 |
| 4,478,650 | 10/1984 | Zado | 148/23 |

Primary Examiner—Peter D. Rosenberg
Attorney, Agent, or Firm—Marmorek, Guttman & Rubenstein

[57] ABSTRACT

A method for the mechanical soft-soldering of heavy metals using a novel fluxing composition is described. The fluxing composition comprises up to 3% by weight of an organic acid based fluxing agent, with the fluxing agent being dissolved in an organic solvent. Succinic acid may be used as the fluxing agent and isopropanol as the solvent. The solution can contain non-ionogenic wetting agents. The solution also contains a carrier component which can be removed by the liquid solder during the soldering process and which effects a removal of the residues of the fluxing agent at the end of the soldering process. The fluxing solution is cleaned through fine-filtration prior to use. The carrier component comprises an ester or an organic acid, said carrier component being liquid at the soldering temperature. Through the use of the carrier component, the formation of bridges and lugs is eliminated.

24 Claims, No Drawings

METHOD FOR THE MECHANICAL SOFT-SOLDERING OF HEAVY METALS UTILIZING A FLUXING AGENT

The invention relates to a method for the mechanical soft-soldering of heavy metals utilizing a rosin-free and halogen-free fluxing agent containing up to 3% by weight of an organic acid based solder-active component and isopropyl alcohol as a solvent. Such a method belongs to the category designated F-SW 32 of the DIN-Norm (German Standard Specification) 8511. In such designation, F=the utilization of a fluxing agent, S=heavy metal as substratum, W=soft-soldering, and the number 32=a fluxing agent based on organic acids. The method according to the invention relates in particular to the rosin-free and halogen-free soldering of printed circuit boards.

In the case of mechanically soldered printed circuit boards, the achievement of flaw-free soldering depends extensively on the fluxing agent which is used. Such a fluxing agent has the task of removing an invisible oxide coating on the substratum during the soldering process, of preventing further oxidation caused by the elevated temperature during soldering, and of making possible thereby the close contact of the liquid solder with the substratum. For the most part, residues of the fluxing agent have to be removed after soldering is completed, in order to prevent corrosion of the printed circuit paths which are sensitive and frequently very thin, and in order to prevent the formation of uncontrollable creepage paths through water-attracting residues of the fluxing agent or of its reaction products with the oxide layer.

Cleaning operations for chlorine-containing or chlorine-free fluxing agents are very expensive and incomplete. In particular, on the upper side of the circuit boards, residues which are still troublesome are frequently present. The cleaning of the upper side is problematic, since the components may not be encapsulated.

Uncleaned printed circuit boards with so-called non-corrosive residues, contain substances such as, for example, rosin. However, these residues cause troubles during the so-called "In Circuit Test", in the course of which many contact points are simultaneously checked by means of a computer, and the alleged faulty points are recorded.

The fluxing agents used in the past are generally used in organic solvents at a concentration of approximately 10-30% by weight of the fluxing agent in the solution.

The present invention is based on the task of creating a soldering method which requires little expenditure in material and time, which allows one to omit washing out the residues and the reaction products of the fluxing agents with organic solvents after the soldering operation is completed, and which makes it possible to furnish, nevertheless, fault-free soldered printed circuit boards with insignificant residues of fluxing agents.

The task is solved by applying to the surface area of an article to be soldered a rosin-free and halogen-free fluxing composition comprising about 0.8% to 3% by weight of an organic acid based solder-active component, about 0.6% to 2.5% by weight of a carrier component, said carrier component being fusible or liquid at the temperature of the melted solder and being removable by a flowing wave of molten solder during the soldering process, said carrier component selected from the group consisting of an ester or an organic acid, and the balance of said fluxing composition comprising a solvent.

The method in accordance with the present invention is very economical and results in a reduction of expense in material and time for the complete production of the printed circuit boards and a reduction in the need to resolder an article. Furthermore, disturbances through insulating points during the "In Circuit Test" are eliminated.

EXAMPLE

Printed circuit boards equipped and washed in a standard manner are soldered by means of the "wave-" or "flow-soldering" methods. The printed circuit boards which are introduced into the soldering machine are treated on one side of the circuit board with a non-foaming solution containing from about 0.8 to about 3% by weight of an organic acid in the solution in a halogen-free organic solvent. This treatment can take place through spraying, spattering, brush-application or in the course of the wave-soldering process. Subsequently, a drying process takes place. The organic acid of the fluxing agent is preferably succinic acid which, owing to its two carboxyl groups separated only by two methylene groups, displays a good oxide-dissolving action. As the solvent, isopropanol, or a mixture of isopropanol with water in which the isopropanol does not essentially exceed the concentration of the azeotropic mixture, is preferred.

The dried printed circuit boards are subsequently soldered by means of the flow-soldering method and afterwards can pass inspection without any further treatment. The soldered junctions are fault-free, despite the fact that considerably less fluxing agent had been used and that the washing processes could be omitted after the soldering operation. Moreover, the succinic acid, together with the other components of the fluxing composition, can be dissolved without any problems in a short time period in isopropanol during the production of the fluxing agent solution.

For improving the uniform wetting of the substratum by means of the fluxing agent solution, a minor amount of a preferably non-ionogenic wetting agent can be added to the fluxing-agent solution, for example, in a concentration of approximately 2 g/l of solution. As a further component of the fluxing agent solution, from about 0.6% to about 2.5% by weight of an ester or an organic acid which melts or is liquid at the temperature of the liquid solder should be included. This additional component acts as a carrier component which is liquid during the course of the soldering process. For example, the fluxing agent solution can include 10 g of a fatty acid ester or suberic acid per liter of the solution. The solder-active component is dissolved in the molten carrier component. Through this, the wetting of the places to be soldered is considerably improved.

The carrier component is subsequently washed off the printed circuit board by means of the flowing wave of molten solder or "solder-wave". The carrier component floats on the molten solder and prevents the formation of disturbing phenomena, such as bridges, lugs, etc., on the substratum.

Together with the carrier component, residues of the fluxing agent and chemical degradation products are also carried along, so that the printed circuit boards remain free of undesirable products.

In order to prevent an accumulation of fluxing agents in the area of complicated mountings or covering elements in these areas, the quantity of the applied fluxing agent can be reduced through special measures, for example, through decrease of the number of revolutions of the drum in cases where the fluxing agent is applied by the "Spray" technique.

During the application of the fluxing agent, metal salts form which accumulate in the fluxing agent bath as insoluble, floating solid particles. Under normal conditions, the accumulation of these particles reaches a limit after a few days, at which time the metal salts may be deposited on the soldered circuit boards. This takes place in an irregular manner, but in particular at the beginning of the working day. The results are spots on the soldered circuit boards. Furthermore, solid particles lead to the reduction of the soldering quality.

These difficulties can be eliminated by continuously filtering the fluxing agent solution through a fine filter, for example, through a filter having a pore size of 3 μm. Through this measure, dust particles as well, which can get into the solution, are removed and the service life of the solution is improved. The used-up components may be replaced by a dilute fluxing agent solution.

The mode of action of the fluxing agent can be explained in the following manner: Application of a thin and quickly fusible layer of the flux solution to the substratum suffices in order to produce fault-free soldering with complete removal of the oxide coating on the conductor paths. Due to the heat from the molten solder, the succinic acid (melting point 185° C.) and the carrier component are melted. They form a completely continuous thin film over the substratum and dissolve the oxide coating. When using Sn/Pb solders, the soldering temperature lies at 240°–260° C. Thereby, a major portion of the succinic acid, which had not been used up during the dissolving of oxides, is decomposed or converted into the anhydride through dehydration.

The undesired products on the substratum are removed together with the carrier component for the most part by means of the solder flow. Thereby, disturbances are not encountered when the circuit board is subjected to the "In Circuit Tests".

For special requirements, for example, for communications technology, considerably simplified cleaning methods can thereafter be used, if necessary. For example, a simple cleaning with water or with a water/alcohol mixture may suffice to provide a considerably improved final cleanliness in comparison with all other fluxing compositions currently being used.

What is claimed is:

1. A method for the mechanical soft soldering of heavy metals comprising applying to the surface area of an article to be soldered a rosin-free and halogen-free fluxing composition comprising about 0.8% to 3% by weight of an organic acid based solder-active component, about 0.6% to 2.5% by weight of a carrier component, said carrier component being liquid at the temperature of the molten solder and being removable by a flowing wave of molten solder during the soldering process, said carrier component selected from the group consisting of an organic ester and an organic acid, and the balance of said fluxing composition comprising a solvent.

2. The method of claim 1 wherein said solvent is isopropyl alcohol or isopropyl alcohol and water.

3. The method of claim 1 wherein the concentration of said carrier component in said fluxing composition is about 1% by weight.

4. The method of claim 1 wherein said carrier component is a fatty acid ester or suberic acid.

5. The method of claim 1 wherein the solder-active component is succinic acid.

6. The method of claim 1 wherein the fluxing composition also contains a non-ionogenic wetting agent.

7. The method of claim 1 wherein said carrier component cleans the surface area of the article to be soldered by removing with it residues of the fluxing composition and chemical degradation products.

8. The method of claim 1 wherein said carrier component is uniformly spread out on the molten solder and binds to metal oxides.

9. The method of claim 1 wherein said solder-active component is dissolved in the liquid carrier component during the soldering process.

10. The method of claim 1 wherein said carrier component improves the distribution of solder-active component on the surface area of the article to be soldered.

11. The method of claim 1 further comprising continuously filtering the fluxing composition prior to applying it to the article to be soldered.

12. The method of claim 11 wherein said fluxing composition is continuously filtered through a filter having a pore size of 3 μm.

13. A method for the mechanical soft soldering of heavy metals comprising applying to the surface area of an article to be soldered a rosin-free and halogen-free fluxing composition comprising about 0.8% to 3% by weight of a succinic acid based solder active component, about 0.6% to 2.5% by weight of a suberic acid based carrier component, said carrier component being liquid at the temperature of the molten solder and being removable by a flowing wave of molten solder during the soldering process, and the balance of said fluxing composition comprising a solvent.

14. The method of claim 13 wherein said fluxing composition contains about 3% by weight of said succinic acid based solder active component.

15. The method of claim 13, wherein said solvent is isopropyl alcohol or isopropyl alcohol and water.

16. The method of claim 13 wherein the concentration of said suberic acid based carrier component in said fluxing composition is about 1% by weight.

17. The method of claim 13 wherein the fluxing composition further comprises a non-ionogenic wetting agent.

18. The method of claim 13 further comprising continuously filtering the fluxing composition prior to applying it to the article to be soldered.

19. The method of claim 18 wherein said fluxing composition is continuously filtered through a filter having a pore size of 3 μm.

20. A fluxing composition for the mechanical soft soldering of heavy metals, comprising about 0.8% to 3% by weight of a succinic acid based solder active component, about 0.6% to 2.5% by weight of a suberic acid based carrier component, said carrier component being liquid at the temperature of the molten solder and being removable by a flowing wave of molten solder during the soldering process, and the balance of said fluxing composition comprising a solvent, said fluxing composition being rosin-free and halogen-free.

21. The fluxing composition of claim 20 wherein said fluxing composition contains about 3% by weight of said succinic acid based solder active component.

22. The fluxing composition of claim 20 wherein said solvent is isopropyl alcohol or isopropyl alcohol and water.

23. The fluxing composition of claim 20 wherein said fluxing composition contains about 1% by weight of said suberic acid based solder active component.

24. The fluxing composition of claim 20 further comprising a non-iogenic wetting agent.

* * * * *